(12) United States Patent
Huang et al.

(10) Patent No.: US 12,541,074 B2
(45) Date of Patent: Feb. 3, 2026

(54) HEAD-MOUNTED DISPLAY DEVICE AND EXTERNAL ADJUSTMENT MODULE

(71) Applicant: HTC Corporation, Taoyuan (TW)

(72) Inventors: Ying-Chieh Huang, Taoyuan (TW);
Wan-Hsieh Liu, Taoyuan (TW);
Jian-Zhi Tseng, Taoyuan (TW);
Chang-Hsueh Liu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 619 days.

(21) Appl. No.: 17/938,943

(22) Filed: Sep. 7, 2022

(65) Prior Publication Data

US 2024/0077696 A1 Mar. 7, 2024

(51) Int. Cl.
G02B 7/02 (2021.01)
G02B 27/00 (2006.01)

(52) U.S. Cl.
CPC ............. *G02B 7/023* (2013.01); *G02B 7/021* (2013.01); *G02B 27/0093* (2013.01)

(58) Field of Classification Search
None
See application file for complete search history.

(56) References Cited

U.S. PATENT DOCUMENTS

| 11,454,779 B1* | 9/2022 | Fang | G02B 27/0093 |
| 2018/0338130 A1* | 11/2018 | Miller | H04N 13/327 |
| 2020/0355928 A1 | 11/2020 | Dai | |
| 2022/0099910 A1 | 3/2022 | Chang et al. | |
| 2022/0187609 A1 | 6/2022 | Snyder et al. | |

FOREIGN PATENT DOCUMENTS

| CN | 105974588 | 9/2016 |
| CN | 207216158 | 4/2018 |
| CN | 114848420 | 8/2022 |
| WO | 2019113974 | 6/2019 |

OTHER PUBLICATIONS

"Office Action of Taiwan Counterpart Application", issued on Oct. 4, 2023, p. 1-p. 6.

* cited by examiner

*Primary Examiner* — Phu Vu
(74) *Attorney, Agent, or Firm* — JCIPRNET

(57) ABSTRACT

A head-mounted display device and an external adjustment module are provided. The head-mounted display device includes a body and the external adjustment module. The body has a first lens and a second lens corresponding to both eyes, and also has a driven mechanism. The first lens and the second lens are respectively coupled to the driven mechanism. The external adjustment module includes a driving element and a transmission element. The transmission element is assembled to the driving element and used for coupling to the driven mechanism. The driving element is used for driving the driven mechanism through the transmission element to adjust a distance between the first lens and the second lens.

13 Claims, 9 Drawing Sheets

US 12,541,074 B2

HEAD-MOUNTED DISPLAY DEVICE AND EXTERNAL ADJUSTMENT MODULE

BACKGROUND

Technical Field

The disclosure relates to a head-mounted display device and an external adjustment module, and more particularly, to a head-mounted display device and an external adjustment module capable of adjusting the interpupillary distance.

Description of Related Art

With the rapid advancement of current technology, the types and functions of head-mounted display devices are also increasingly diversified. Take an eye mask type head-mounted display device as an example: when the user wears such a device, the gyroscope and position tracker inside the head-mounted display device will track the user's movement state to deliver the corresponding scene image, providing the user with the experience of being in a virtual world.

When a head-mounted display device is used, since the interpupillary distance of each user is different, the distance between the two lenses in the head-mounted display device must be adjustable so that each user may have the best user experience. Currently, the head-mounted display device mainly has the function of manually adjusting the distance between the two lenses. However, each user may not necessarily be able to adjust the two lenses to the proper position.

SUMMARY

The disclosure provides a head-mounted display device and an external adjustment module to provide the function of electrically adjusting the interpupillary distance.

The head-mounted display device according to the disclosure includes a body and the external adjustment module. The body has a first lens and a second lens corresponding to both eyes, and also has a driven mechanism. The first lens and the second lens are respectively coupled to the driven mechanism. The external adjustment module includes a driving element and a transmission element. The transmission element is assembled to the driving element and used for coupling to the driven mechanism. The driving element is used for driving the driven mechanism through the transmission element to adjust a distance between the first lens and the second lens.

An eye tracking module of the disclosure is applied to a head-mounted display device. An external adjustment module is used for being assembled and electrically connected to a body of the head-mounted display device. The external adjustment module includes a driving element and a transmission element. The transmission element is assembled to the driving element and used for coupling to the driven mechanism. The driving element is used for driving the driven mechanism of the body through the transmission element to adjust a distance between a first lens and a second lens of the body.

Based on the above, in the head-mounted display device and the external adjustment module of the disclosure, the driving element is located in the external adjustment module, so the head-mounted display device with the external adjustment module has the function of electrically adjusting the interpupillary distance. In addition, when the product life of the driving element ends, it is only necessary to replace the external adjustment module without discarding the entire head-mounted display device and purchasing a new head-mounted display device, which not only reduces the cost of use for users, but also meets the requirements of today's society for environmental protection.

DESCRIPTION OF EMBODIMENTS

Figure 1:
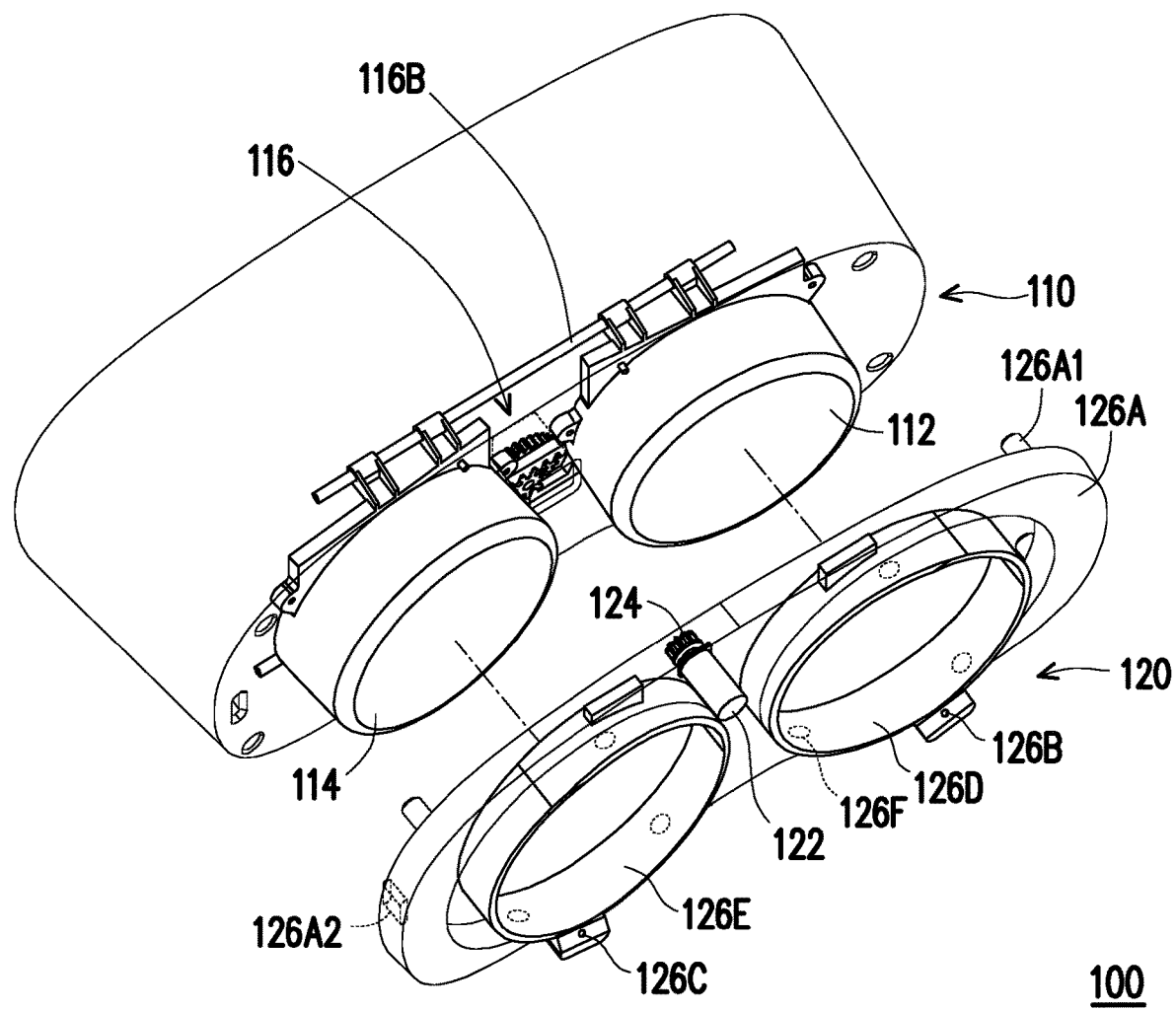
FIG. 1 is a schematic view of a head-mounted display device in a dissembled state according to an embodiment of the invention.
Figure 2:
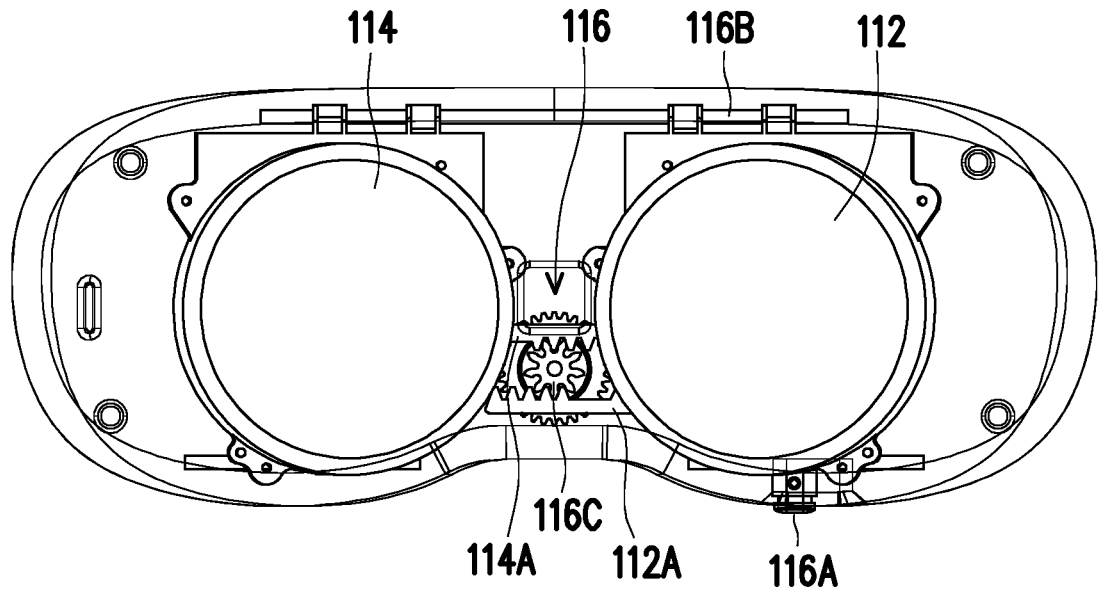
FIG. 2 is a schematic view of some elements of the head-mounted display device of FIG. 1.

FIG. 1 is a schematic view of a head-mounted display device in a dissembled state according to an embodiment of the invention. FIG. 2 is a schematic view of some elements of the head-mounted display device of FIG. 1. With reference to FIG. 1 and FIG. 2, the head-mounted display device 100 of this embodiment includes a main 110 and an external adjustment module 120 according to an embodiment of the invention. The body 110 has a first lens 112 and a second lens 114 corresponding to both eyes, and also has a driven mechanism 116. For the convenience of description, the casing of the body 110 in FIGS. 1 and 2 is presented in a translucent manner. The first lens 112 and the second lens 114 are respectively coupled to the driven mechanism 116. The external adjustment module 120 includes a driving element 122 and a transmission element 124. The transmission element 124 is assembled to the driving element 122 and used for coupling to the driven mechanism 116 116. The driving element 122 is used for driving the driven mechanism 116 through the transmission element 124 to adjust a distance between the first lens 112 and the second lens 114.

The distance between the first lens 112 and the second lens 114 corresponds to the interpupillary distance. When a user experiences the head-mounted display device 100, the external adjustment module 120 may be used to set it properly, so as to ensure that both eyes may enter the sweet spot of vision and reduce the occurrence of blurred and out-of-focus images. Thus, an ideal visual experience of the head-mounted display device 100 is obtained.

In the head-mounted display device 100 of this embodiment, the driving element 122 is disposed in the external adjustment module 120. Therefore, when the driving element 122 is damaged due to excessive use or other reasons, only the external adjustment module 120 has to be replaced with a new one, and the original body 110 of the head-mounted display device 100 may continue to be used, and it is not necessary to throw away the entire head-mounted display device 100. In this way, not only the use cost of the user may be reduced, but also the requirements of the current society for environmental protection are met.

For example, both the first lens 112 and the second lens 114 are slidably disposed on a sliding rod 116B of the driven mechanism 116. A rack 112A of the first lens 112 and a rack 114A of the second lens 114 are both meshed with a gear 116C of the driven mechanism 116. When the gear 116C rotates, the rack 112A and the rack 114A may drive the first lens 112 and the second lens 114 to approach or move away from each other. In addition, the transmission element 124 is coupled to the gear 116C of the driven mechanism 116. Therefore, the driving element 122 may drive the gear 116C to rotate through the transmission element 124 to achieve the purpose of adjusting the distance between the first lens 112 and the second lens 114.

When the user wants to use the external adjustment module 120 to perform the function of automatically adjusting the interpupillary distance, the external adjustment module 120 is assembled to the body 110 first. Then, the body may execute the corresponding software. The software, for example, provides an interface for the user to decide whether to increase or decrease the distance between the first lens 112 and the second lens 114. According to the user's instruction, the driving element 122 is activated to drive the transmission element 124, thereby driving the first lens 112 and the second lens 114 to move to change the distance between the first lens 112 and the second lens 114. Then, the user may adjust the distance between the first lens 112 and the second lens 114 again according to the change of the clarity of the seen image until the user may see the clearest image.

In this embodiment, the driven mechanism 116 includes a manual control element 116A for the user to drive the driven mechanism 116 through the manual control element 116A to adjust the distance between the first lens 112 and the second lens 114. That is, when the user does not want to use the driving element 122 to adjust the distance between the first lens 112 and the second lens 114 electrically, the user may directly move the exposed part of the manual control element 116A to move the first lens 112 and the second lens 114. The manual control element 116A is, for example, connected to the second lens 114. When the user pulls the manual control element 116A, the second lens 114 may be driven to move. At this time, the second lens 114 also drives the gear 116C to rotate through the rack 114A, and then the gear 116C drives the rack 112A and the first lens 112 to move, so as to achieve the purpose of adjusting the distance between the first lens 112 and the second lens 114.

In this embodiment, the external adjustment module 120 further includes an outer frame 126A, a first camera lens 126B, a second camera lens 126C, a first camera lens frame 126D and a second camera lens frame 126E. The outer frame 126A is used to assemble and electrically connect to the body 110. For the convenience of description, the outer frame 126A in FIG. 1 is presented in a translucent manner. The driving element 122 is disposed on the outer frame 126A. The first camera lens frame 126D and the second camera lens frame 126E are disposed on the outer frame 126A to be relatively slidable. The first camera lens frame 126D is used to combine with the first lens 112. The second camera lens frame 126E is used to combine with the second lens 114. The first camera lens 126B is disposed on the first camera lens frame 126D. The second camera lens 126C is disposed on the second camera lens frame 126E. The first camera lens 126B and the second camera lens 126C are used for photographing both eyes.

The outer frame 126A of the external adjustment module 120 is directly positioned on the body 110. Since the first camera lens frame 126D and the second camera lens frame 126E have been set on the outer frame 126A in advance, it may be ensured that there is no assembly error between the first camera lens frame 126D and the outer frame 126A, and that there is also no assembly error between the second camera lens frame 126E and the outer frame 126A. Therefore, as long as there is no assembly error when the outer frame 126A is positioned on the body 110, the first camera lens 126B and the second camera lens 126C may be used to perform the eye tracking function normally, so that the application may make more changes using the eye tracking function. For example, the outer frame 126A is directly positioned on the body 110 by using a positioning pillar 126A1, and the positioning between the two may be assisted by magnetic force, but the disclosure is not limited thereto. The outer frame 126A may be electrically connected to the body 110 through a connection port 126A2. For example, when the connection port 126A2 is a connector, the outer frame 126A may be electrically connected to the body 110 through a cable and the connection port 126A2. In addition, the outer frame 126A may be connected to the body 110 by wireless or other signals. In more detail, the images of the eyeballs photographed by the first camera lens 126B and the second camera lens 126C are transmitted to the body 110 via the connection port 126A2, and the images of the eyeballs may be processed to generate relevant data such as eyeball gaze points or eyeball postures.

When the user wants to use the external adjustment module 120 that provides the eye tracking function to perform the function of automatically adjusting the interpupillary distance, the software may first require the user to look in a specific direction, and at the same time the driving element 122 is activated to drive the transmission element 124, thereby driving the first lens 112 and the second lens 114 to move. When the first lens 112 and the second lens 114 move to multiple different positions, multiple images are photographed by the first camera lens 126B and the second camera lens 126C. The software may calculate and obtain the user's eye information according to these images to obtain the appropriate interpupillary distance, and further drive the driving element 122 to move the first lens 112 and the second lens 114 to positions corresponding to the appropriate interpupillary distance. Therefore, the purpose of automatic adjustment of the interpupillary distance may be achieved.

In this embodiment, the external adjustment module 120 may further include multiple light emitting elements 126F, which are respectively disposed on the first camera lens frame 126D and the second camera lens frame 126E. The light emitting element 126F may provide illumination when the function of automatically adjusting the interpupillary distance is performed, so as to improve the speed and accuracy of the automatic adjustment of the interpupillary distance. The driving element 122 is, for example, a stepper motor with a micro reducer, but the driving element 122 may be a brush motor, a DC brushless motor, a servo motor, an AC brushless motor, and the like, and it is not limited thereto. More specifically, these light emitting elements 126F illuminate the eyeballs, so the photographed images of the eyeballs include light spots, and the images are easier to undergo image processing, to facilitate generation of relevant data such as eyeball gaze points or eyeball postures.

Figure 3:
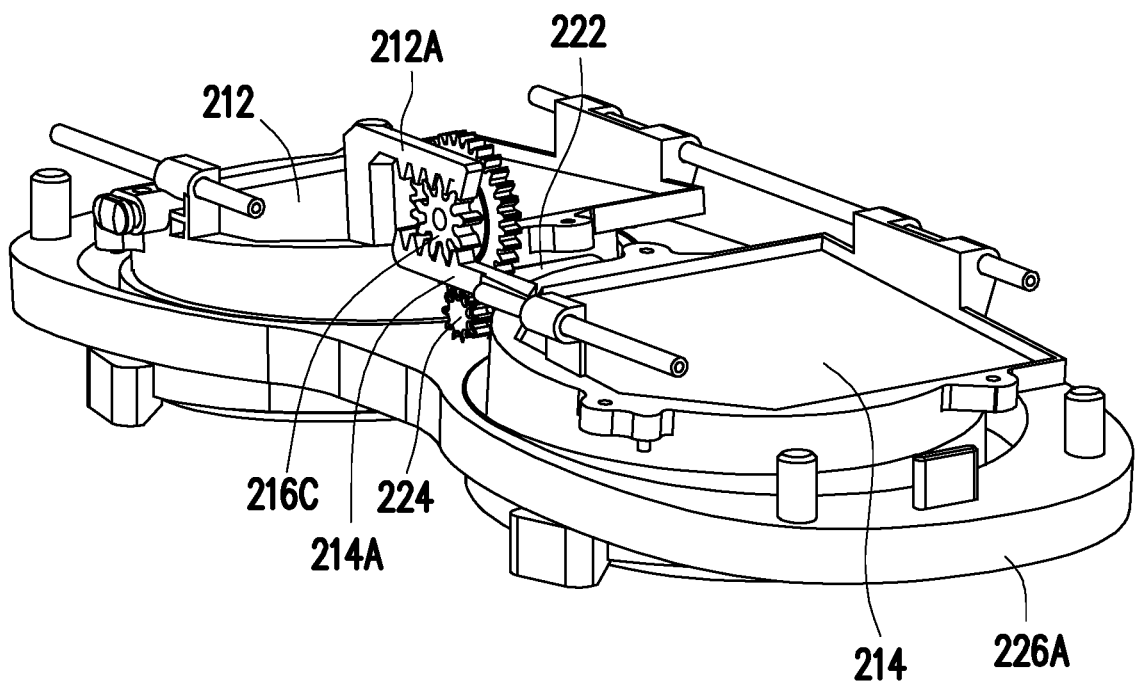
FIG. 3 is a schematic view of some elements of a head-mounted display device according to another embodiment of the invention.

FIG. 3 is a schematic view of some elements of a head-mounted display device according to another embodiment of the invention. With reference to FIG. 3, the head-mounted display device of this embodiment is similar to the head-mounted display device 100 of FIG. 1, and only the differences between the two are described here. For convenience of description, the casing of the body is omitted in FIG. 3. The rotation axis of the gear 116C of FIG. 1 is parallel to the assembly direction of the outer frame 126A when assembled to the body 110, but the rotation axis of the gear 216C in the embodiment of FIG. 3 is perpendicular to the assembly direction of the outer frame 226A when assembled to the body. Correspondingly, the rotational or moving directions of the driving element 222, the transmission element 224, the rack 212A of the first lens 212 and the rack 214A of the second lens 214 also change, but the linkage relationship between these elements does not change. Therefore, the driving element 222 may still be used to adjust the distance between the first lens 212 and the second lens 214.

Figure 4:
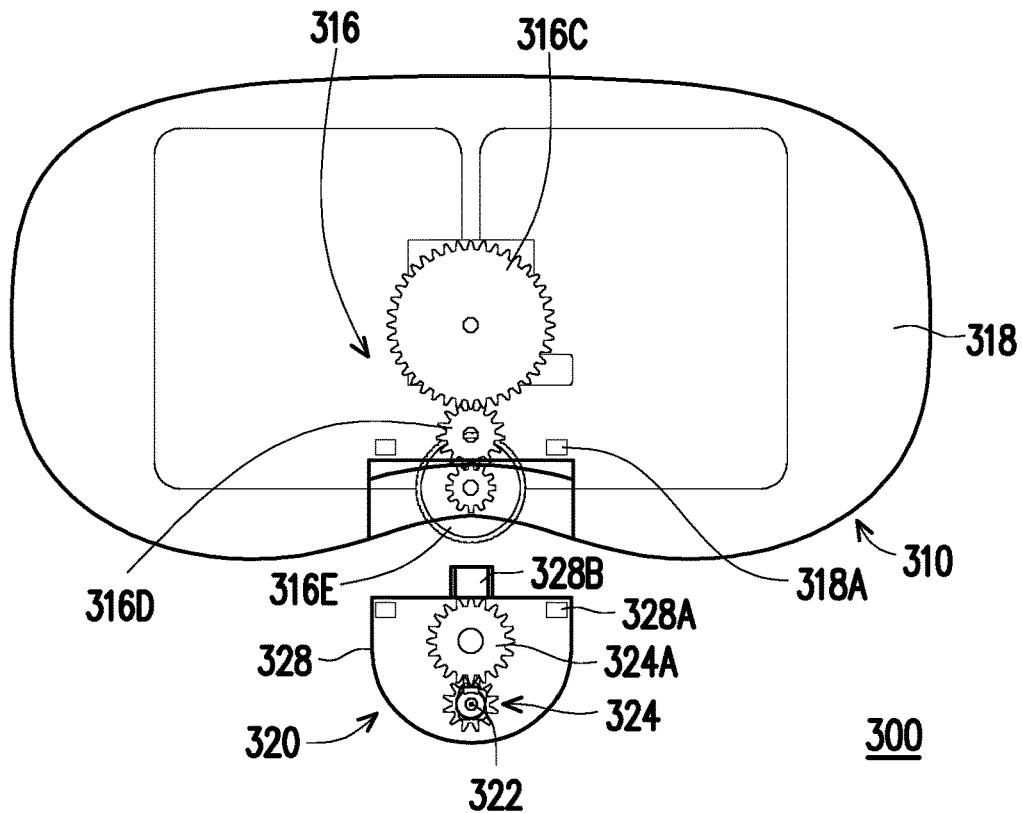
FIG. 4 is a schematic view of a head-mounted display device in a dissembled state according to still another embodiment of the invention.
Figure 5:
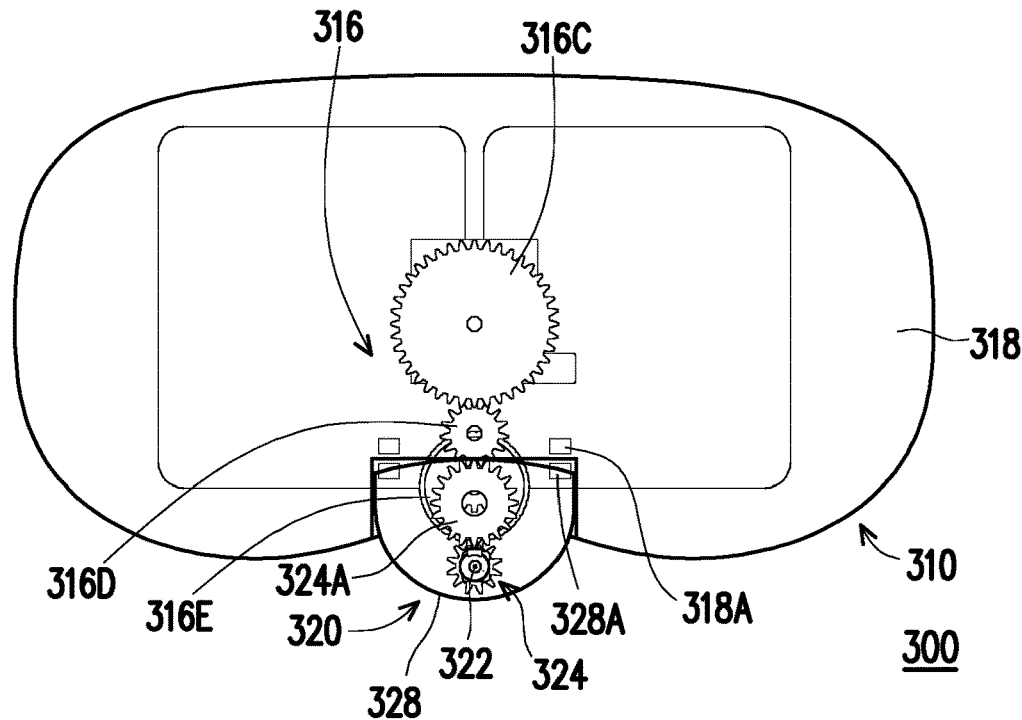
FIG. 5 is a schematic view of some elements of the head-mounted display device of FIG. 4.

FIG. 4 is a schematic view of a head-mounted display device in a dissembled state according to another embodiment of the invention. FIG. 5 is a schematic view of some elements of the head-mounted display device of FIG. 4. With reference to FIG. 4 and FIG. 5, the head-mounted display device 300 of this embodiment is similar to the head-mounted display device 100 of FIG. 1, and only the differences between the two are described here. The external adjustment module 320 of this embodiment further includes a casing 328, and the driving element 322 and the transmission element 324 are assembled to the casing 328. The transmission element 324 may be a single element or a combination of multiple elements, such as one or more gear sets, bevel gears, planetary gears or connecting rods. The external adjustment module 320 in this embodiment mainly provides the function of adjusting the distance between the lenses. The user may assemble the external adjustment module 320 to the body 310 only when the interpupillary distance needs to be adjusted. The casing 318 of the body 310 of this embodiment may be provided with a space for accommodating the casing 328 of the external adjustment module 320, so as to exhibit the function of guiding assembly. This method may provide the limit in two directions, but is not constrained in the assembly direction. A magnet 318A may be provided on the casing 318, and a magnet 328A may also be provided on the casing 328. The magnet 318A and the magnet 328A attract each other to facilitate assembly, and also prevent the external adjustment module 320 from leaving the body 310 due to the thrust of the gear 316C and the gear 316D of the driven mechanism 316 during operation.

In this embodiment, the external adjustment module 320 further includes a connector 328B for connecting with the body 310 to obtain power and driving signals. In the state of FIG. 4, the external adjustment module 320 is not assembled to the body 310. At this time, the gear 316E of the driven mechanism 316 is partially exposed. Therefore, the user may manually rotate the gear 316E, thereby driving the gear 316D and the gear 316C to manually adjust the interpupillary distance. In the state of FIG. 5, the external adjustment module 320 is assembled to the body 310. At this time, the gear 324A of the transmission element 324 meshes with the gear 316D of the driven mechanism 316. Therefore, the driving element 322 may drive the gear 324A, thereby driving the gear 316D and the gear 316C to adjust the interpupillary distance electrically.

In an embodiment not shown, the external adjustment module 320 may further include a control part, which also includes required firmware. Therefore, the external adjustment module 320 is applied to various head-mounted display devices, and may be disposed and used instantly without any firmware settings. After the external adjustment module 320 is installed, the current relative position of the lens may be obtained from the body 310. Alternatively, the external adjustment module 320 may further include a position sensor. After the external adjustment module 320 is installed, the lens of the body 310 may be controlled to move to the boundary position to confirm the position of the boundary, and then the position sensor may be positioned by positioning each point in the middle of the two boundaries. In addition, the user may also pre-store their own suitable interpupillary distance in the body 310, and directly read the data and adjust after the external adjustment module 320 is installed.

Figure 6A:
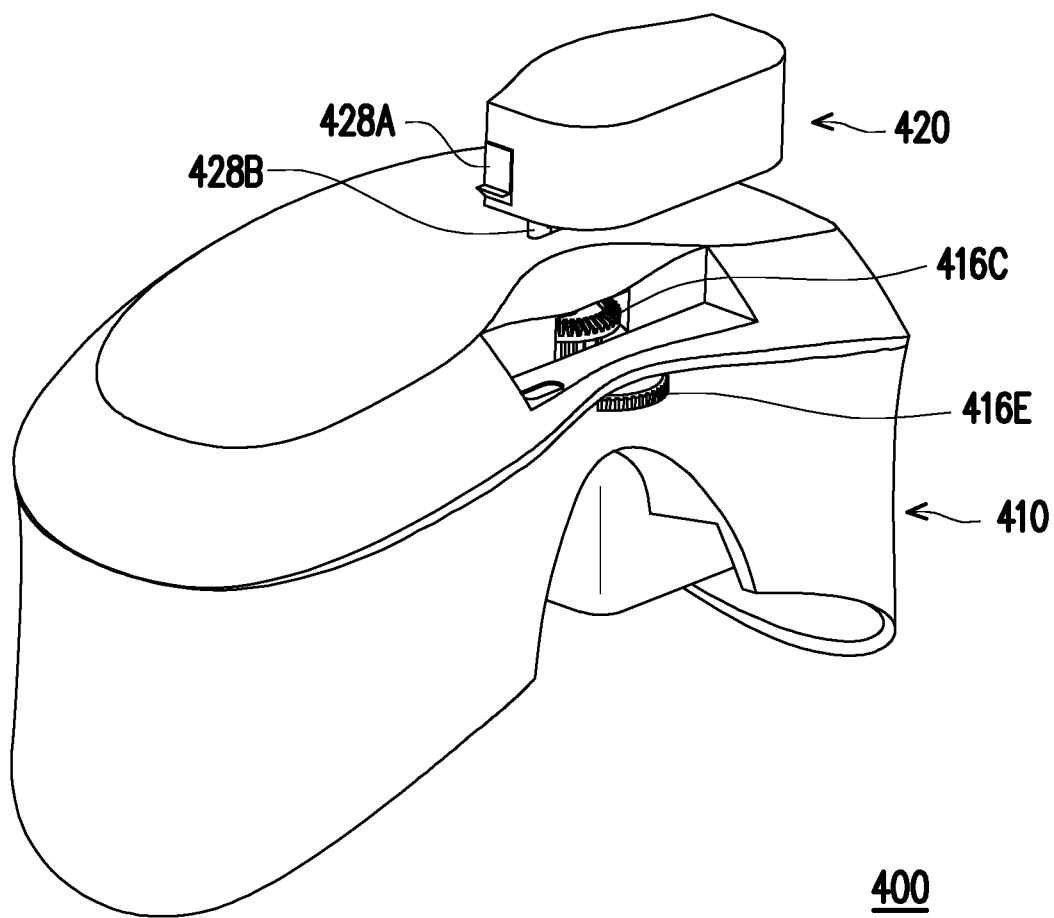
FIG. 6A is a schematic view of a head-mounted display device in a dissembled state according to still another embodiment of the invention.
Figure 6B:
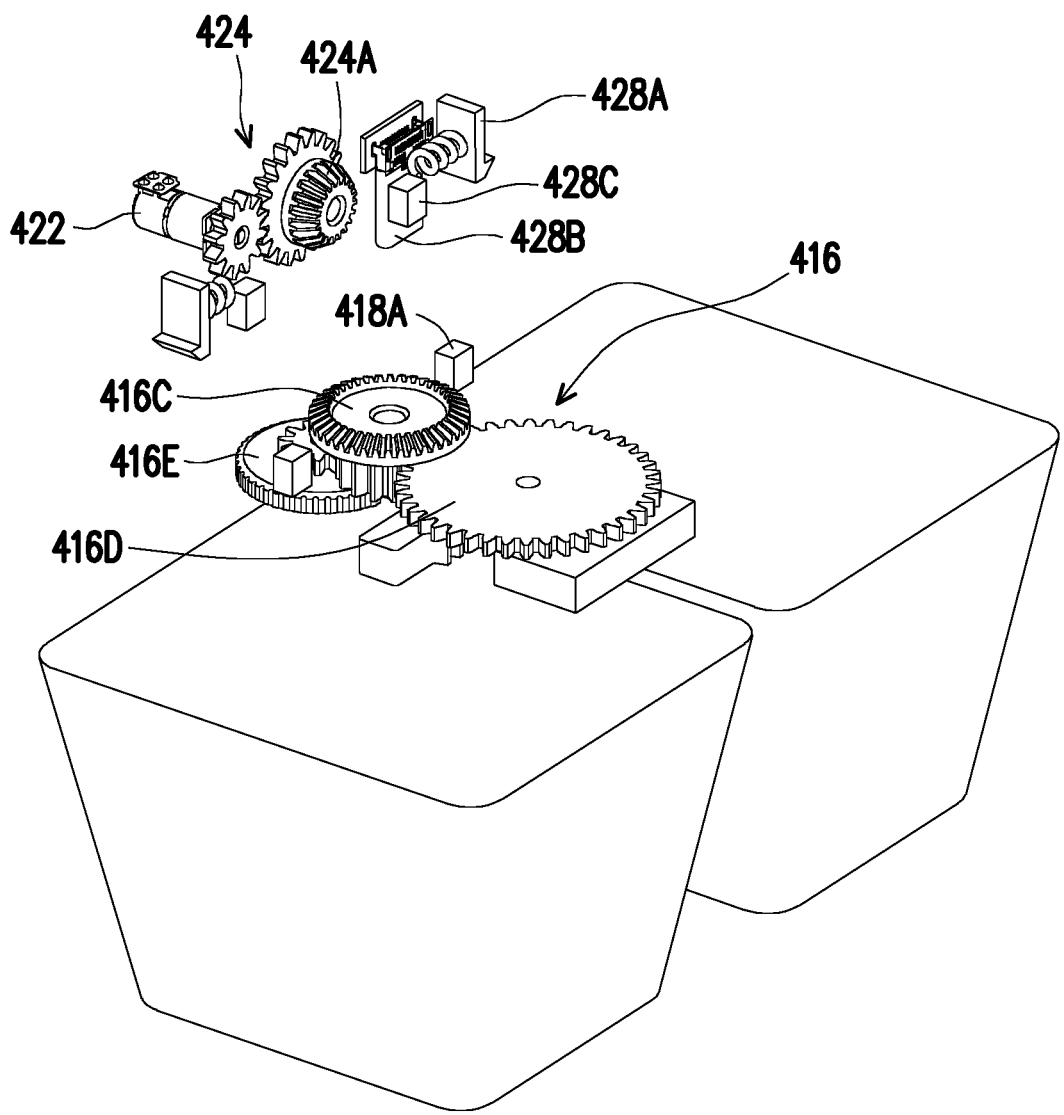
FIG. 6B is a schematic view of the internal elements of the head-mounted display device of FIG. 6A when viewed from another viewing angle.
Figure 7A:
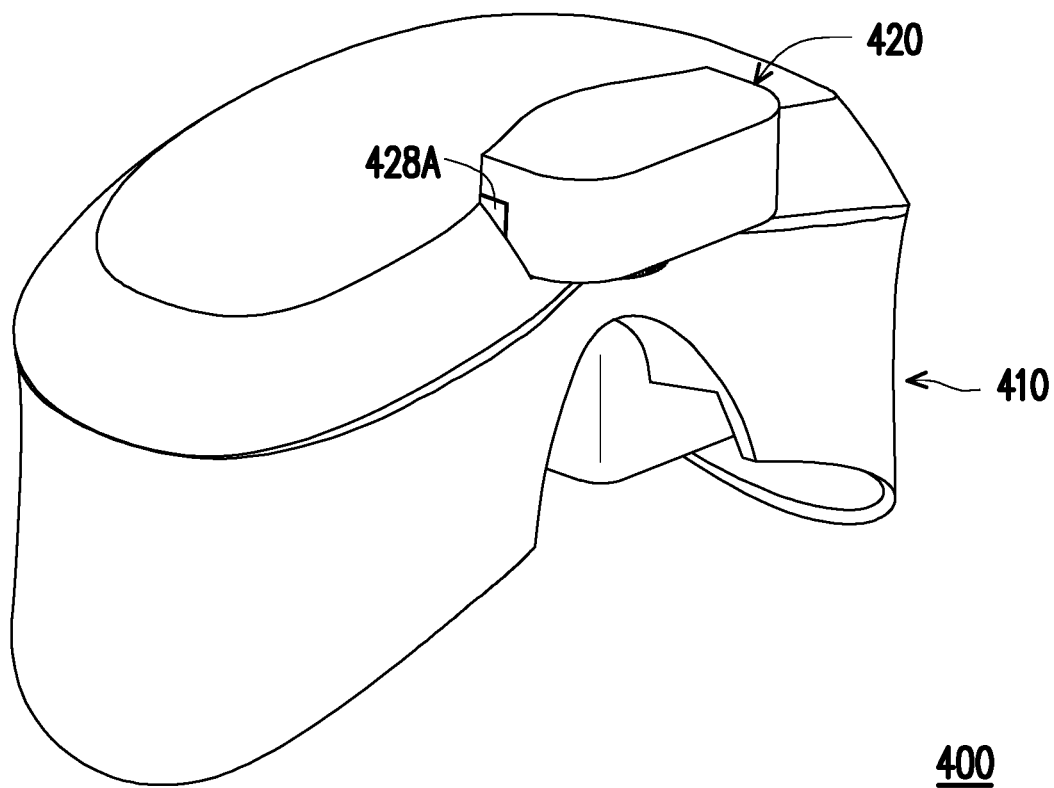
FIG. 7A is a schematic view of the head-mounted display device of FIG. 6A in an assembled state.

FIG. 6A is a schematic view of a head-mounted display device in a dissembled state according to still another embodiment of the invention. FIG. 6B is a schematic view of the internal elements of the head-mounted display device of FIG. 6A when viewed from another viewing angle. FIG. 7A is a schematic view of the head-mounted display device of FIG. 6A in an assembled state. With reference to FIG. 6A and FIG. 7A, the head-mounted display device 400 of this embodiment is similar to the head-mounted display device 300 of FIG. 4, and only the differences between the two are described here. The rotation axis of the gear 316C in FIG. 4 is perpendicular to the assembly direction of the external adjustment module 320 when assembled to the body 310, but the rotation axis of the gear 416C in the embodiment of FIG. 6A is parallel to the assembly direction of the external adjustment module 420 when assembled to the body 410. However, the external adjustment module 420 may still be used to adjust the distance between the lenses. In addition, the external adjustment module 420 may include a latching element 428A for latching the body 410. The external adjustment module 420 may further include a connector 428B for connecting with the body 410 to obtain power and driving signals.

Figure 7B:
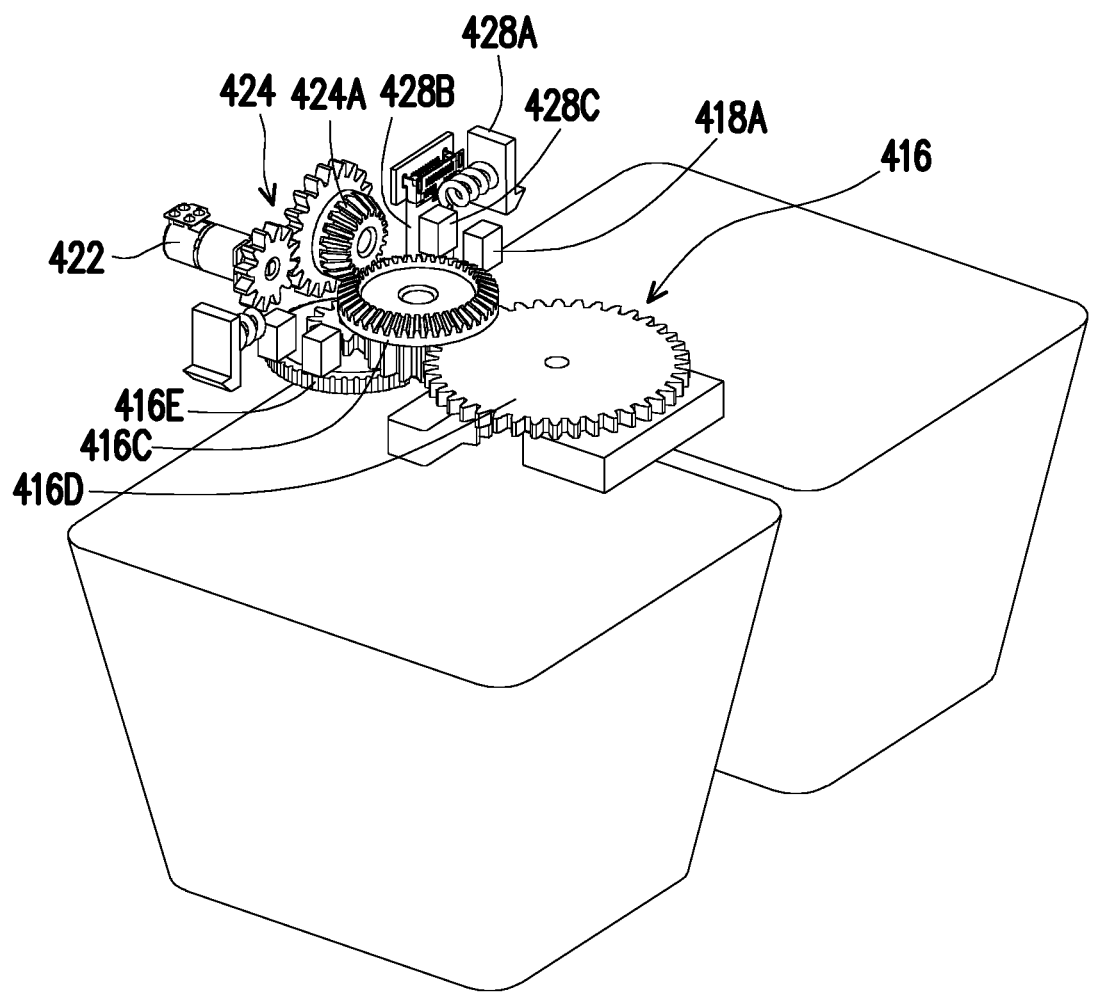
FIG. 7B is a schematic view of the internal elements of the head-mounted display device of FIG. 7A when viewed from another viewing angle.

FIG. 7B is a schematic view of the internal elements of the head-mounted display device of FIG. 7A when viewed from another viewing angle. In the state of FIG. 6A and FIG. 6B, the external adjustment module 420 is not assembled to the body 410. At this time, the gear 416E of the driven mechanism 416 is partially exposed. Therefore, the user may manually rotate the gear 416E, thereby driving the gear 416C and the gear 416D to manually adjust the interpupillary distance. In the state of FIG. 7A and FIG. 7B, the external adjustment module 420 is assembled to the body 410. At this time, the gear 424A of the transmission element 424 meshes with the gear 416C of the driven mechanism 416. Therefore, the driving element 422 may drive the gear 424A, thereby driving the gear 416C and the gear 416D to adjust the interpupillary distance electrically. In this embodiment, the part where the gear 424A and the gear 416C mesh with each other is in the form of bevel gears.

The body 410 of this embodiment may be provided with a magnet 418A, and the external adjustment module 420 may also be provided with a magnet 428C. The magnet 418A and the magnet 428C attract each other to facilitate assembly, and also prevent the external adjustment module 420 from leaving the body 410 due to the thrust of the gear 416C and the gear 416D of the driven mechanism 416 during operation.

Figure 8A:
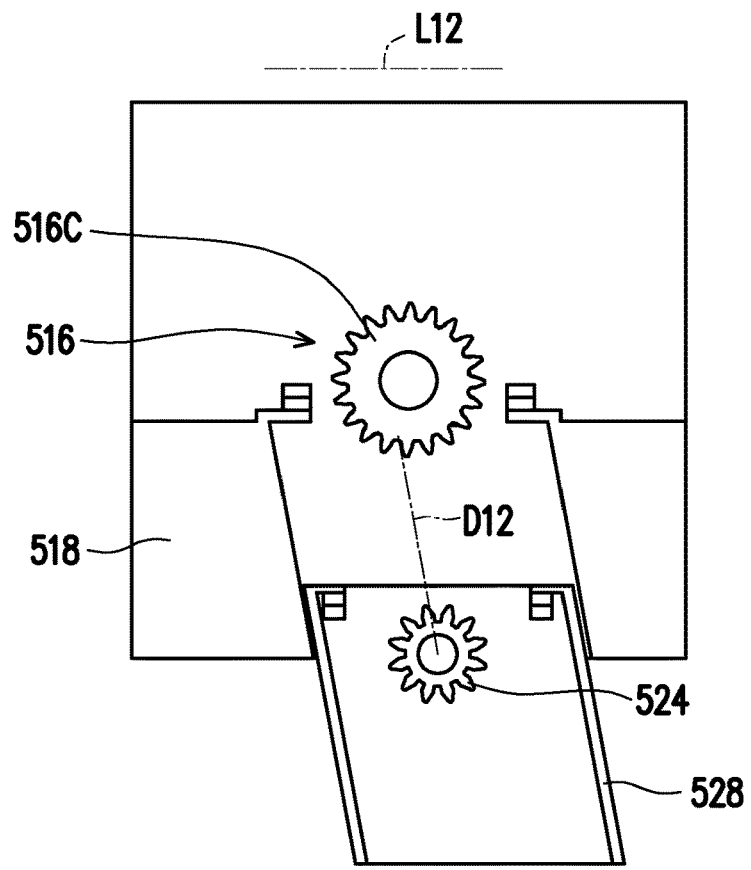
FIGS. 8A and 8B are schematic views illustrating a coupling process of a transmission element and a driven mechanism according to an embodiment of the invention.
Figure 8B:
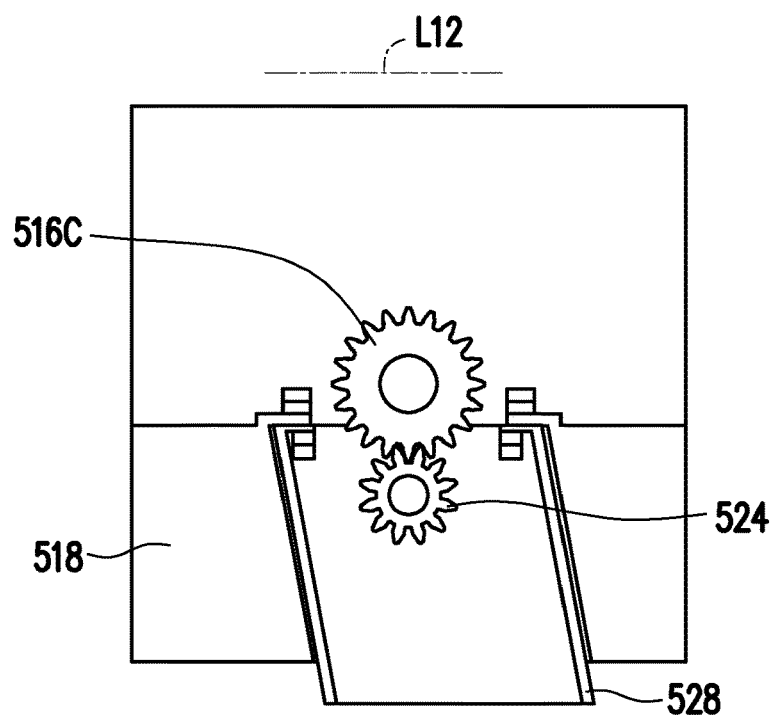

FIGS. 8A and 8B are schematic views illustrating a coupling process of a transmission element and a driven mechanism according to an embodiment of the invention. For convenience of description, FIGS. 8A and 8B only show some components of the head-mounted display device. With reference to FIGS. 8A and 8B, the transmission element 524 of this embodiment is coupled to the driven mechanism 516 along an assembly direction D12. The assembly direction D12 is not perpendicular to the connection line L12 connecting the center of the first lens (with reference to the first lens 112 of FIG. 2) and the center of the second lens (with reference to the second lens 114 of FIG. 2). The transmission element 524 may be a gear, and coupled thereto is the gear 516C of the driven mechanism 516. During the coupling process of the two, it is possible that the meshing teeth cannot be smoothly meshed because the meshing teeth of each other are facing each other. However, if the meshing teeth of the transmission element 524 are facing the meshing teeth of the gear 516C of the driven mechanism 516, the meshing teeth of the two may abut each other and thus cannot be smoothly meshed. With the design that the assembly direction D12 is not perpendicular to the connection line L12, the probability that the meshing teeth of each other are facing each other during assembly may be reduced, thereby improving the possibility of smooth assembly. In this embodiment, the shape matching of the casing 528 of the external adjustment module and the casing 518 of the body 510 is used to achieve the design that the assembly direction D12 is not perpendicular to the connection line L12. In this embodiment, the transmission element 524 and the gear 516C are, for example, spur gears, but in other embodiments, they may be bevel gears or other elements, and disclosure is not limited thereto.

Figure 9A:
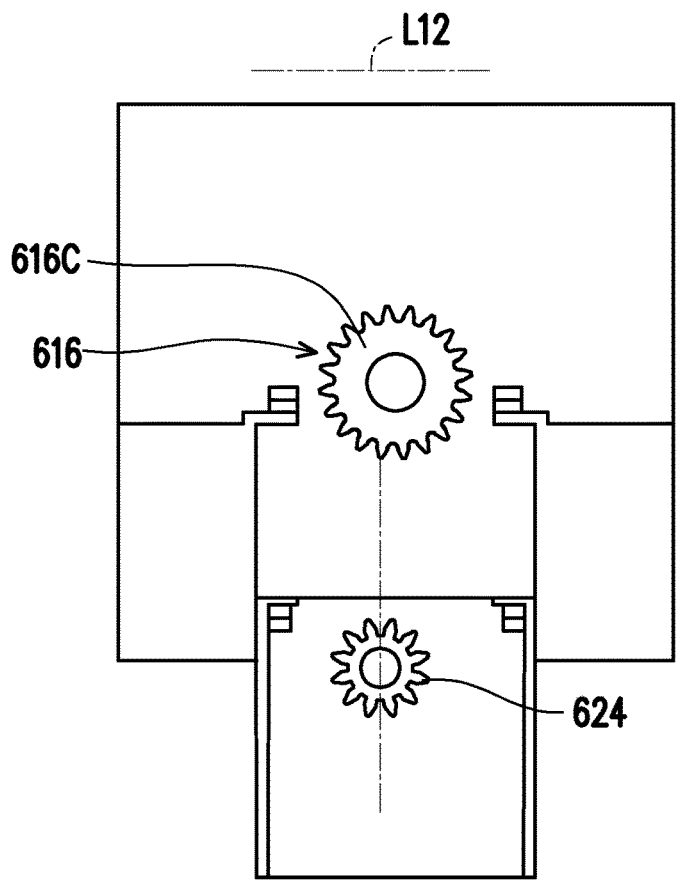
FIGS. 9A and 9B are schematic views illustrating a coupling process of a transmission element and a driven mechanism according to another embodiment of the invention.
Figure 9B:
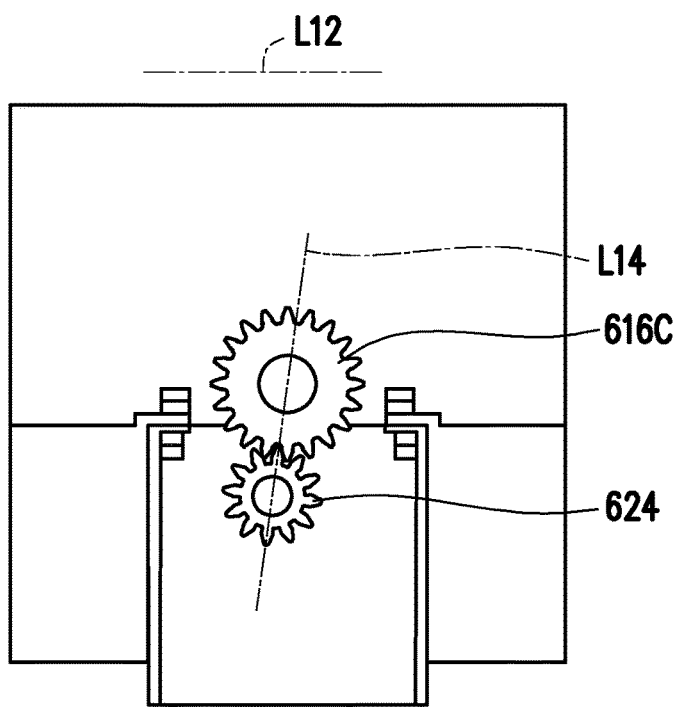

FIGS. 9A and 9B are schematic views illustrating a coupling process of a transmission element and a driven mechanism according to another embodiment of the invention. For convenience of description, FIGS. 9A and 9B only show some components of the head-mounted display device. With reference to FIGS. 9A and 9B, the transmission element 624 of this embodiment is a first gear 624, and the driven mechanism 616 includes a second gear 616C. When the first gear 624 is coupled to the second gear 616C, the connection line L14 connecting the center of the first gear 624 and the center of the second gear 616C is not perpendicular to the connection line L12 connecting the center of the first lens (with reference to the first lens 112 of FIG. 2) and the center of the second lens (with reference to the second lens 114 of FIG. 2). Although the first gear 624 moves in the direction perpendicular to the connection line L12 during the process of coupling the second gear 616C, because the design makes the first gear 624 and the second gear 616C misaligned, it may reduce the probability of direct facing during assembly, thereby increasing the possibility of a smooth assembly. In this embodiment, the first gear 624 and the second gear 616C are, for example, spur gears, but in other embodiments, they may be bevel gears or other elements, and disclosure is not limited thereto.

In summary, in the head-mounted display device and the external adjustment module of the disclosure, the head-mounted display device with the external adjustment module has the function of electrically adjusting the interpupillary distance. Even if the driving element with a short product life is damaged, it is not necessary to discard the entire head-mounted display device and purchase a new one, and only the external adjustment module needs to be replaced. In addition, if the user does not want to use the external adjustment module, the user does not have to purchase the external adjustment module, and the head-mounted display device also provides the function of manually adjusting the interpupillary distance. In this way, it may meet the needs of different users, and also meet the requirements of today's society for environmental protection.

What is claimed is:

1. A head-mounted display device comprising:
    a body comprising a first lens and a second lens corresponding to both eyes, and further comprising a driven mechanism, wherein the first lens and the second lens are respectively coupled to the driven mechanism; and
    an external adjustment module configured for being assembled and being electrically connected to the body, wherein the external adjustment module comprises a driving element and a transmission element, the transmission element is assembled to the driving element and is configured for coupling to the driven mechanism, the driving element is configured for driving the driven mechanism through the transmission element to adjust a distance between the first lens and the second lens,
    wherein the external adjustment module further comprises an outer frame, a first camera lens, a second camera lens, a first camera lens frame and a second camera lens frame,
    the outer frame is configured for being assembled and being electrically connected to the body,
    the first camera lens frame and the second camera lens frame are disposed on the outer frame to be relatively slidable,
    the first camera lens frame is configured for combining with the first lens,
    the second camera lens frame is configured for combining with the second lens,
    the first camera lens is disposed on the first camera lens frame,
    the second camera lens is disposed on the second camera lens frame, and
    the first camera lens and the second camera lens are configured for photographing both eyes.

2. The head-mounted display device according to claim 1, wherein
    the driving element is disposed on the outer frame.

3. The head-mounted display device according to claim 1, wherein the external adjustment module further comprises a plurality of light emitting elements, which are respectively disposed on the first camera lens frame and the second camera lens frame.

4. The head-mounted display device according to claim 1, wherein the external adjustment module further comprises a magnet or a latching element configured for being assembled to the body.

5. The head-mounted display device according to claim 1, wherein the transmission element is coupled to the driven mechanism along an assembly direction, and the assembly direction is not perpendicular to a connection line connecting a center of the first lens and a center of the second lens.

6. The head-mounted display device according to claim 1, wherein the transmission element is a first gear,
    the driven mechanism comprises a second gear, and
    when the first gear is coupled to the second gear, a connection line connecting a center of the first gear and a center of the second gear is not perpendicular to a connection line connecting a center of the first lens and a center of the second lens.

7. The head-mounted display device according to claim 1, wherein the driven mechanism comprises a manual control element configured for a user to drive the driven mechanism through the manual control element to adjust the distance between the first lens and the second lens.

8. An external adjustment module applied to a head-mounted display device, wherein the external adjustment module is configured for being assembled and being electrically connected to a body of the head-mounted display device,
- wherein the external adjustment module comprises a driving element and a transmission element,
- the transmission element is assembled to the driving element and is configured for coupling to the driven mechanism,
- the driving element is configured for driving the driven mechanism through the transmission element to adjust a distance between a first lens and a second lens of the body,
- wherein the external adjustment module further comprises an outer frame, a first camera lens, a second camera lens, a first camera lens frame and a second camera lens frame,
- wherein the outer frame is configured for being assembled and being electrically connected to the body,
- the first camera lens frame and the second camera lens frame are disposed on the outer frame to be relatively slidable,
- the first camera lens frame is configured for combining with the first lens,
- the second camera lens frame is configured for combining with the second lens,
- the first camera lens is disposed on the first camera lens frame,
- the second camera lens is disposed on the second camera lens frame, and
- the first camera lens and the second camera lens are configured for photographing both eyes.

9. The external adjustment module according to claim 8, wherein
the driving element is disposed on the outer frame.

10. The external adjustment module according to claim 8, further comprising a plurality of light emitting elements, which are respectively disposed on the first camera lens frame and the second camera lens frame.

11. The external adjustment module according to claim 8, further comprising a magnet or a latching element configured for being assembled to the body.

12. The external adjustment module according to claim 8, wherein the transmission element is coupled to the driven mechanism along an assembly direction, and the assembly direction is not perpendicular to a connection line connecting a center of the first lens and a center of the second lens.

13. The external adjustment module according to claim 8, wherein the transmission element is a first gear,
- the driven mechanism comprises a second gear, and
- when the first gear is coupled to the second gear, a connection line connecting a center of the first gear and a center of the second gear is not perpendicular to a connection line connecting a center of the first lens and a center of the second lens.

* * * * *